Sept. 2, 1941.   C. H. H. RODANET   2,255,005
MEASURING INSTRUMENT HAVING CAPSULES
Filed May 14, 1940    2 Sheets-Sheet 1

INVENTOR:
CHARLES HILAIRE HENRI RODANET
BY Haseltine, Lake & Co
ATTORNEYS

Sept. 2, 1941.   C. H. H. RODANET   2,255,005
MEASURING INSTRUMENT HAVING CAPSULES
Filed May 14, 1940   2 Sheets-Sheet 2

INVENTOR:
CHARLES HILAIRE HENRI RODANET
BY: Haseltine, Lake & Co
ATTORNEYS

Patented Sept. 2, 1941

2,255,005

UNITED STATES PATENT OFFICE 2,255,005

MEASURING INSTRUMENT HAVING CAPSULES

Charles Hilaire Henri Rodanet, Neuilly-sur-Seine, France, assignor to Société Anonyme: Jaeger-Aviation, Levallois-Perret, Seine, France Application May 14, 1940, Serial No. 335,084
In France June 2, 1939

2 Claims. (Cl. 137—156.5)

The present invention has for object improvements in measuring instruments provided with capsules, operating in particular, under the action of a fluid under pressure or under partial vacuum, in order that the apparatus should have several degrees of sensitiveness according to the values of the pressure or of the partial vacuum of the fluid.

The improvements according to the invention are mainly characterized by the fact that the measuring instrument comprises at least two capsules simultaneously subjected to the action of the fluid and so arranged that their distortions are added to each other, one of them being however subjected to the action of abutments, which are preferably adjustable, and allow of determining at will the limits (beginning and end) of its distortion relatively to the distortion of the other capsule.

For instance:

(a) an abutment can be provided which limits the distortion of the first capsule to a certain value. Until this value is obtained, the distortions of both capsules are added to each other and the instrument has great sensitiveness; but beyond this value the second diaphragm alone distorts and the sensitiveness diminishes.

(b) an abutment can be provided by means of which the first capsule is subjected to an initial distortion corresponding to the predetermined value. Until this value is obtained the second diaphragm alone distorts, and the sensitiveness is reduced; but thereafter, the distortions of both diaphragms are added and the sensitiveness is increased.

(c) both abutment systems can finally be provided, which allows of determining at will the lower and upper limits of the zone of high sensitiveness.

Preferably, the capsules are simultaneously subjected to the action of the fluid by causing them to directly communicate together.

The abutments can be fixed but it is advantageous to make them adjustable.

The invention includes all measuring apparatus comprising not only two, but more than two capsules, the various capsules acting simultaneously between certain definite values, the distortions of said capsules being outside said limited values successively and in stages, or simultaneously, so as to obtain a series of different sensitivenesses.

The invention also includes the new industrial products constituted by measuring apparatus such as anemometers, pressure-gauges, altimeters or the like having a plurality of capsules as above defined.

Other particular points, also included in the scope of the present invention will appear in the following text given with reference to the accompanying drawings, by way of example only, in which.

Figure 1:
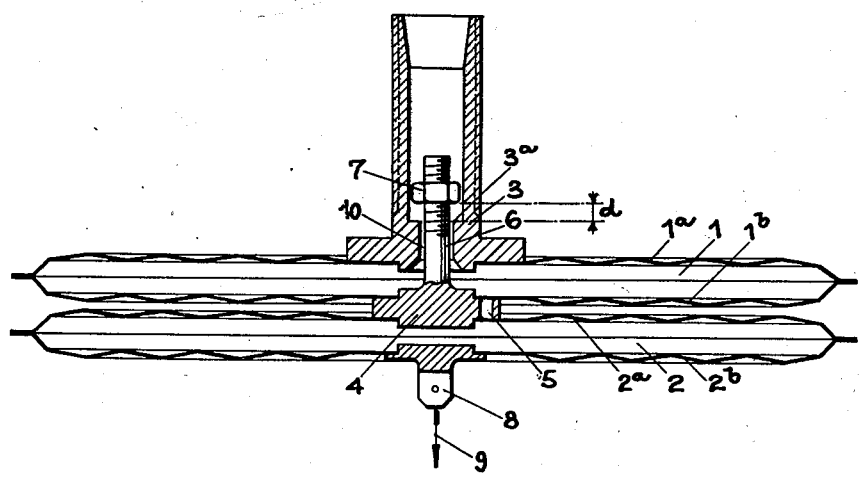
Fig. 1 is a general elevation, in axial section, of a double capsule system for an anemometer in a first embodiment cooperating with a Pitot tube.
Figure 2:
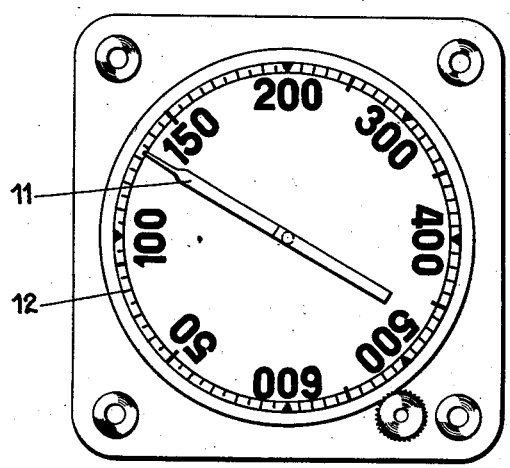
Fig. 2 is a front view of the dial of the speed indicator of the anemometer.

In the example of Figs. 1 and 2, the sensitive system of the anemometer is constituted by two capsules 1 and 2. The face 1a of the capsule 1 is rendered rigid, in its central region, with a fixed support 3 of tubular shape and which is branched, for instance, on an air-intake.

The face 1b of capsule 1 and the face 2a of capsule 2 are rendered centrally rigid with a common intermediate member 4 perforated at 5 for putting both capsules in communication together and which is provided with an axial tail piece 6. This tail piece 6 engages in the tubular member 3 and comprises an adjusting nut 7 which limits, with a shoulder 3a of member 3, a stroke $d$ corresponding to the maximum distortion which can be reached by the wall 1b relatively to the wall 1a.

It will be noted that the central part of the wall 2b of capsule 2 comprises a fork 8 for connection to indicating means for instance.

The operation of the device previously described is as follows:

In position of rest, the various members occupy the position illustrated in Fig. 1. As soon as the fluid under pressure acts in the tubular member 3, said pressure immediately exists in capsule 1 and in capsule 2 which are in communication through the passage 5.

Both capsules 1 and 2 simultaneously distort in the direction of the arrow 9, the sensitiveness being double. In proportion as the pressure increases, said distortion increases until the nut 7, which has been initially adjusted in position, presses against the shoulder 3a. At this moment, the wall 1b and member 4 are held stationary in the direction of the arrow 9. However, the capsule 2 can still freely move, the sensitiveness being then single.

The communication between the tubular member 3 and the first capsule 1 is ensured either solely through the axial passage 10 in which passes the tail piece 6 with a certain amount of play, or both through said passage and perforations provided around said passage so that the application of nut 7 on the shoulder 3a does not cut off the communication between said member 3 and the first capule 1.

In the example illustrated, the fork 8 controls, through the medium of a suitable gearing-up device, the rotation of an index 11 movable opposite graduations 12 extending over 360 degrees. These graduations bear indications in kilometers per hour.

On board an aeroplane for instance, the pilot must be informed very accurately of the speed of his aeroplane relatively to the relative wind between 0 and 200 kilometers per hour in particular, in modern aeroplanes. In fact, during any range of speeds he must effect delicate operations and in particular, flying off or landing. In these conditions, the double sensitiveness of both capsules 1 and 2 acts between 0 and 200 kilometers per hour, these graduations occupying 180 degrees. The other part, that is to say 180 degrees, is graduated from 200 to 600 kilometers per hour, the index 11 being only subjected to the single sensitiveness of the capsule 2.

Figure 3:
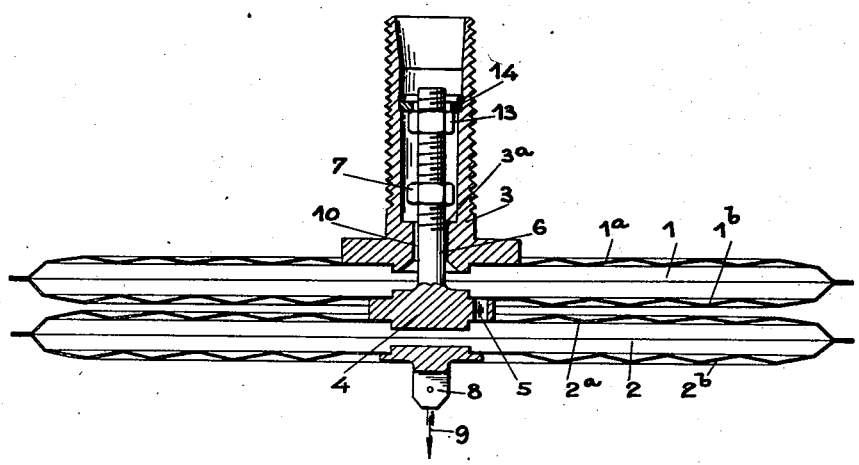
Fig. 3 is an elevation relating to a second embodiment also cooperating with a Pitot tube.
Figure 4:
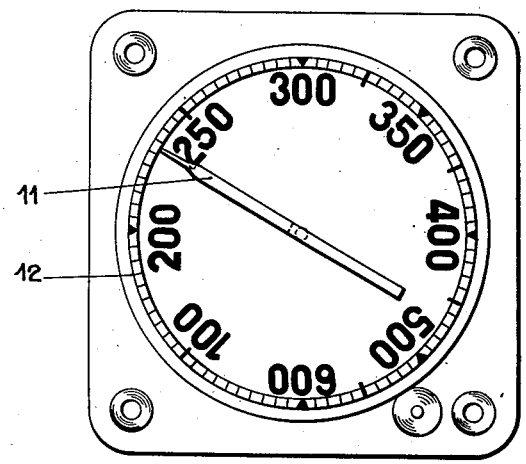
Fig. 4 is a front view of the dial of said second embodiment.

In the example of Figs. 3 and 4, the rod 6 receives a second nut 13 which cooperates with an abutment 14 in such a manner that the diaphragm 1b of capsule 1 is initially subjected to a certain distortion corresponding to a given value of the pressure. Up to this value (which is for instance that obtained when the aeroplane moves at 200 kilometers an hour) the capsule 2 acts alone, and the sensitiveness between 0 and 200 is single. From this value, the sensitiveness is double, until the nut 7 comes in contact with the abutment 3a, which corresponds for instance to 480 kilometers an hour. The operation is then resumed, as in the preceding example, with single sensitiveness.

In both these embodiments, the diaphragms are bulged by the pressure created by a Pitot tube. But, use can quite as well be made of diaphragms which flatten under the action of atmospheric pressure, the capsules cooperating with a Venturi tube.

In this case, in the position of rest, the nut 7 of Fig. 3 is in contact with the abutment 3a, because it exerts on capsule 1 an initial flattening stress; and, on the contrary, the nut 13 is at a suitable distance from the abutment 14 for stopping, after a certain stroke, the flattening of said capsule 1. The operation is obviously identical to the preceding one.

It will be noted that with capsules of different characteristics, any variations of sensitiveness can be obtained and not only variations in a single ratio.

What I claim as my invention and desire to secure by Letters Patent is:

1. In an apparatus for measuring the pressure of fluids, of the type comprising distortable fluid-tight capsules, a first capsule having a wall centrally secured to a fixed conduit admitting the fluid the pressure of which is to be measured, a second capsule juxtaposed on the first one, a connection interposed between the central parts of the adjacent walls of both capsules for rigidly connecting said walls, said connection being perforated for causing the capsules to communicate together, a rod rigidly secured on said connection and adapted to extend within the conduit admitting the fluid in the first capsule, an abutment on said rod for limiting the distortions of the first capsule, and means on the outer wall of the last capsule of the series for allowing to connect the same to the usual indicating means.

2. In an apparatus for measuring the pressure of fluids, of the type comprising distortable fluid-tight capsules, a first capsule having a wall centrally secured to a fixed conduit admitting the fluid the pressure of which is to be measured, a second capsule juxtaposed on the first one, a connection interposed between the central parts of the adjacent walls of both capsules for rigidly connecting said walls, said connection being perforated for causing the capsules to communicate together, a rod rigidly secured on said connection and adapted to extend within the conduit admitting the fluid in the first capsule, a first adjustable abutment on said rod cooperating with an abutment on said conduit for allowing to impart an initial tension to the outer wall of the first capsule, a second abutment on said rod for limiting the distortions of the first capsule and means on the outer wall of the last capsule of the series for allowing to connect the same to the usual indicating means.

CHARLES HILAIRE HENRI RODANET.